United States Patent
Joseph et al.

(10) Patent No.: US 8,801,190 B2
(45) Date of Patent: Aug. 12, 2014

(54) INFRARED IMAGING PROJECTION FOR CAMERA BLOCKING

(75) Inventors: Daniel Mark Joseph, Los Angeles, CA (US); David Stanley Wishart, Jr., Westminster, CA (US); Jere Mark Kirkley, Winter Garden, FL (US); Peter Stepniewicz, Winter Garden, FL (US); Mark A. Reichow, Valencia, CA (US); Christopher Raynard Runco, Burbank, CA (US); Thomas E. Brentnall, Cypress, CA (US); Thomas Fraiser LaDuke, Orange, CA (US)

(73) Assignee: Disney Enterprises, Inc., Burbank, CA (US)

( * ) Notice: Subject to any disclaimer, the term of this patent is extended or adjusted under 35 U.S.C. 154(b) by 146 days.

(21) Appl. No.: 13/310,150

(22) Filed: Dec. 2, 2011

(65) Prior Publication Data

US 2012/0138821 A1    Jun. 7, 2012

Related U.S. Application Data

(63) Continuation-in-part of application No. 12/187,363, filed on Aug. 6, 2008, now Pat. No. 8,439,503.

(51) Int. Cl.
*G03B 21/26* (2006.01)

(52) U.S. Cl.
USPC .................................................. 353/79

(58) Field of Classification Search
CPC ........................................... G03B 21/26
USPC ................... 353/10; 348/743–771; 349/61
See application file for complete search history.

(56) References Cited

U.S. PATENT DOCUMENTS

| | | | | |
|---|---|---|---|---|
| 5,528,425 | A * | 6/1996 | Beaver | 359/629 |
| 6,042,235 | A * | 3/2000 | Machtig et al. | 353/28 |
| 6,298,047 | B1 * | 10/2001 | Steffes et al. | 370/310 |
| 6,559,883 | B1 * | 5/2003 | Fancher et al. | 348/164 |
| 6,828,733 | B1 * | 12/2004 | Crenshaw | 315/150 |
| 2002/0171813 | A1 * | 11/2002 | Kimura et al. | 353/122 |
| 2004/0091110 | A1 * | 5/2004 | Barkans | 380/201 |
| 2008/0174742 | A1 * | 7/2008 | Ito | 353/31 |

* cited by examiner

*Primary Examiner* — Thanh Luu
*Assistant Examiner* — Danell L Owens
(74) *Attorney, Agent, or Firm* — Patent Ingenuity, P.C.; Samuel K. Simpson

(57) ABSTRACT

A mirror is at least partially transparent on a first side and at least partially reflective on a second side. The mirror is positioned at an angle in front of a display such that visible light emitted from the display is reflected from the second side. Further, the a plurality of invisible light emitters are positioned in front of the second side that transmits the invisible light through the mirror from the second side to the first side.

15 Claims, 12 Drawing Sheets

INFRARED IMAGING PROJECTION FOR CAMERA BLOCKING

RELATED APPLICATIONS

This application is a Continuation-In-Part application of U.S. patent application Ser. No. 12/187,363, filed on Aug. 6, 2008, entitled INFRARED IMAGING PROJECTION, which is hereby incorporated by reference in its entirety.

BACKGROUND

1. Field

The subject matter disclosed herein relates to infrared imaging projection.

2. General Background

Solid state imaging devices, such as digital cameras and camcorders, comprising solid state imaging sensors provide the user with image recording capability that can be used in many ways. Users may now capture images with a quality approaching that of photographic film on relatively affordable devices. The proliferation of portable devices with solid state imaging sensors is extensive. Solid state imaging sensors are found in dedicated digital cameras and camcorders, as well as integrated into other devices such as mobile phones, handheld computers, personal digital assistants and/or the like.

It is becoming commonplace that at least one solid state imaging device is available to or is carried by each person that attends a venue, such as an entertainment complex, theme park, zoo, and museum. The proliferation of solid state imaging devices has impacted revenue generating services normally provided by the venue. For example, a museum may offer for sale photographs of artwork in the form of photobooks and postcards, but a visitor may be able to obtain high quality digital images of the same artwork using a solid state imaging device.

Another noteworthy example is the candid photo service offered at the point of exit of an attraction, especially such as those found at a theme park. It has become commonplace for theme parks to offer keepsake photos of the visitor experiencing, for example, a moment of high excitement on a thrill ride attraction. Upon exiting of the attraction, the visitor may be presented with a high definition display monitor displaying the candid image and an offer for sale of a photo of that image. It is becoming commonplace that instead of the visitor purchasing the candid photo, the visitor is simply capturing the image off of the display monitor using their solid state imaging device.

SUMMARY

In one aspect of the disclosure, an apparatus is provided. The apparatus includes a mirror that is at least partially transparent on a first side and at least partially reflective on a second side. The mirror is positioned at an angle in front of a display such that visible light emitted from the display is reflected from the second side. Further, the apparatus includes a plurality of invisible light emitters positioned in front of the second side that transmits the invisible light through the mirror from the second side to the first side.

In another aspect of the disclosure, a process is provided. The process emits visible light comprising an image in a first direction. Further, the process emits invisible light in a second direction not coincident with the first direction. In addition, the process bends at least one of the visible light and the invisible light such that the visible light and the invisible light are combined and directed at a viewing location.

In yet another aspect of the disclosure, an apparatus is provided. The apparatus includes a mirror that is at least partially transparent on a first side and at least partially reflective on a second side. The mirror is positioned at an angle in front of a display such that visible light emitted from the display is transmitted through the mirror from the first side to the second side and invisible light transmitted to the second side is reflected from the second side. Further, the apparatus includes a plurality of invisible light emitters positioned in front of the second side that transmits the invisible light to the second side such that the invisible light is reflected from the second side.

BRIEF DESCRIPTION OF THE DRAWINGS

Non-limiting and non-exhaustive embodiments will be described with reference to the following figures, wherein like reference numerals refer to like parts throughout the various figures unless otherwise specified.

DETAILED DESCRIPTION

Countermeasures are needed to prevent the capturing of an image from a display monitor using an imaging device to obtain quality images of high value content.

It is also desired to take advantage of the proliferation of imaging devices to offer a visitor to an entertainment venue an enhanced entertainment experience using such devices.

References are made herein to "infrared image projection installations". Such an infrared image projection installation may comprise any suitable apparatus for projecting infrared light. For example, an optical projector may have a light engine comprising an infrared light emitting source capable of illumination in the infrared spectrum. One such infrared light emitting source may comprise light emitting diodes that illuminate in the infrared spectrum at about 780 nm to about 1200 nm which is outside of the normally visible spectrum and therefore unseen by the unaided eye. An optical projector so equipped may be used for many purposes, such as, but not limited to, to flood an area with infrared light, and to project an image in the infrared spectrum onto a substance.

References are made herein to "solid state imaging devices". In this context, a solid state imaging device is one having a solid state imaging sensor capable of imaging at least a portion of the infrared spectrum. Solid state imaging devices include, such as, but not limited to, digital cameras, digital camcorders, and integrated devices having a solid state imaging sensor, such as mobile phones, portable game consoles, notebook computers, personal digital assistants and/or the like. The solid state imaging sensors may comprise any one of several solid state devices capable of capturing image information, such as, for example, charged-coupled devices (CCDs) and complementary metal-oxide semiconductor (CMOS) devices.

In particular embodiments illustrated herein, infrared illumination may be used to obscure an image displayed on a display monitor as viewed and/or recorded by a solid state imaging device. In a particular embodiment, the quality of an image on a display monitor captured using a solid state imaging device may be degraded so as to discourage capturing the image on a display monitor. According to another embodiment, the image on a display monitor as viewed and/or recorded by a solid state imaging device may be annotated with a message. In these embodiments, the visible aspects of the image on a display monitor are not significantly modified to the unaided eye.

In a particular embodiment, a visitor presents a solid state imaging device having the capability of imaging at least a portion of the infrared spectrum. For instance, such visitor may carry, wear or otherwise be co-located with a solid state imaging device such as, for example, a digital camera, digital camcorder, and integrated devices having a solid state imaging sensor, such as a mobile phone, notebook computer, personal digital assistant, and/or the like.

Figure 1:
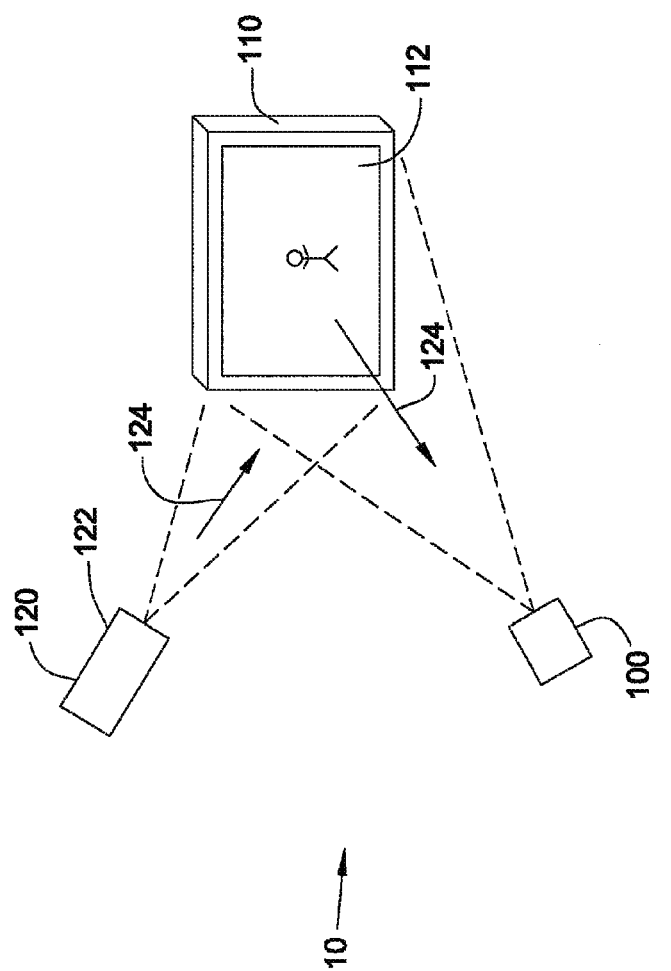
FIG. 1 illustrates a system comprising an infrared projection installation configured to obscure an image on a display monitor as viewed and/or recorded by a solid state imaging device according to an embodiment.

FIG. 1 illustrates system 10 comprising infrared projection installation 122 configured to obscure an image on display monitor 112 as viewed and/or recorded by solid state imaging device 100 according to an embodiment. In the particular implementation of FIG. 1, visitors associated with solid state imaging devices 100 may receive an infrared image, invisible with the unaided eye, reflecting from display screen 112 being illuminated by infrared image projection installation 120. Infrared image projection installation 120 may be installed adjacent display monitor 110 so as to illuminate display screen 112 of display monitor 110 with infrared illumination 124. According to an embodiment, infrared illumination 124 reflected from display screen 112 may be sufficient to at least partially obscure the visible portion of the resulting image as received by solid state imaging device 100 sufficient to render the image undesirable.

Figure 2:
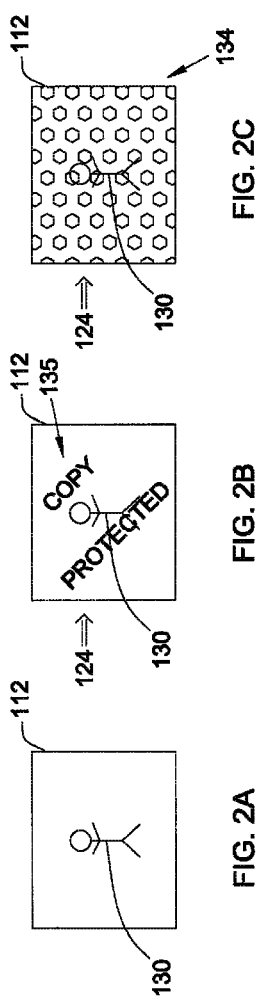
FIGS. 2A-2C illustrate various images by way of example in accordance with embodiments.

FIGS. 2A-2C illustrate various images by way of example. FIG. 2A illustrates visible image 130 as presented in the visible spectrum. According to an embodiment, infrared illumination 124 reflected from display screen 112 comprises message 135 superimposed onto visible image 130 displayed on display screen 112. Here, such a superimposed message may spoil the resulting image received by solid state imaging device 100 sufficient to render the visible image 130 undesirable, as shown in FIG. 2B. Such a message 135 may state, for example, but is not limited to, "copy protected".

In a particular implementation of FIG. 1, solid state imaging device 100 may receive infrared illumination 124, invisible with the unaided eye, reflecting from display screen 112 of display monitor 110 being illuminated by infrared projection installation 122. Infrared projection installation 122 may be installed adjacent display monitor 110 so as to illuminate display screen 112. According to an embodiment, infrared projection installation 122 may illuminate display screen 112 in sufficient infrared illumination 124 so as to oversaturate pixels of solid state imaging device 100 with infrared energy resulting in an over-exposed, or washed-out image 134, obscuring the visible image 130 sufficient to render the image as received by solid state imaging device 100 undesirable, as illustrated in FIG. 2C. It is noted, in passing, that while this particular embodiment is illustrated as an imaging system, other embodiments may comprise video systems employing infrared projections. Therefore, in the context of this patent application, the term imaging is intended to include video systems and the like.

Figure 3:
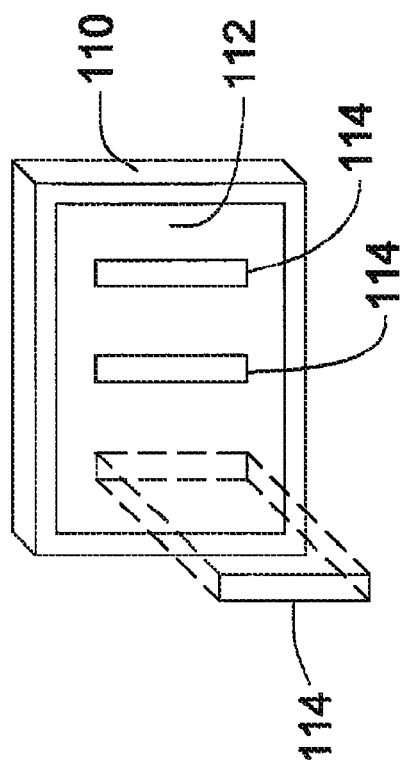
FIG. 3 is an exploded perspective view of a display device in accordance with a particular implementation.

In a particular implementation, display monitor 110 may be modified so as to improve the infrared reflectivity of display screen 112. FIG. 3 is a partially exploded perspective view of display device 110 including overlay 114, in accordance with a particular implementation. In accordance with an embodiment, overlay 114 comprises material having properties that may be reflective of infrared radiation. Overlay 114 may be placed on at least a portion of display screen 112, either permanently or removably coupled thereto. Here, overlay 114 may be sufficiently transparent to the visible spectrum so as not to substantially degrade the visible image that may be shown on display screen 112 as viewed by the unaided eye.

In accordance with an embodiment, overlay 114 may be placed over a particular portion of the display that may show a visible image that may be visible to the unaided eye so as to obscure the visible image if viewed by an imaging device. In accordance with another embodiment, overlay 114 may be placed on the display screen 112 but adjacent to the visible image so as not to necessarily obscure the visible image but, by way of example, not limited thereto, to provide a message.

In accordance with an embodiment, overlay 114 comprises a sheet material including indium tin oxide (ITO). Indium tin oxide is substantially optically transparent to the visible spectrum, substantially reflective in the infrared spectrum, and colorless in thin layers. Thin films of ITO may be deposited on surfaces by electron beam evaporation, physical vapor deposition, and/or sputter deposition techniques, among others. ITO is known to be used to make transparent conductive coatings for liquid crystal displays, flat panel displays, plasma displays, touch panels, electronic ink applications, organic light-emitting diodes, among others.

It is appreciated that the ITO film may be applied to the inside surface of display screen 112, the outside surface of display screen 112, or a part of display screen 112 suitable for the purpose previously described.

In particular embodiments illustrated herein, infrared illumination may be used to spoil an image of an object as viewed and/or recorded by a solid state imaging device. In a particular embodiment, the quality of an image of an object captured using a solid state imaging device may be degraded so as to discourage photographing the object with such an imaging device. According to another embodiment, the image of an object as viewed and/or recorded by a solid state imaging device may be annotated with a message. In these embodiments, the visible aspects of the object are not modified to the unaided eye.

Figure 4:
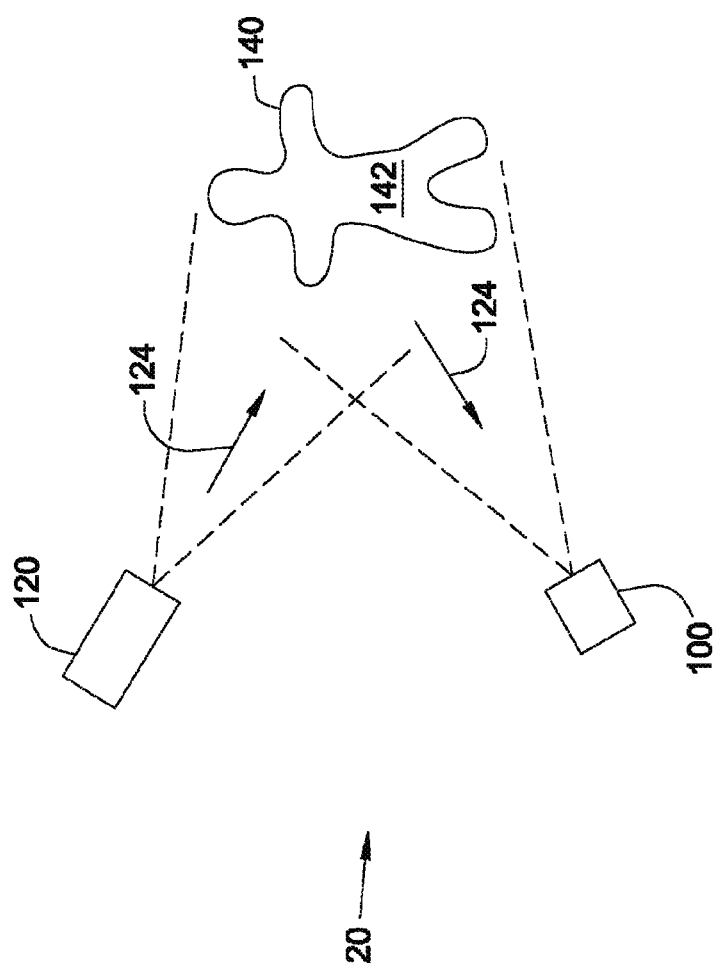
FIG. 4 illustrates a system configured to obscure an image of an object as viewed and/or recorded by a solid state imaging device according to an embodiment.

FIG. 4 illustrates system 20 configured to obscure an image of object 140 as viewed and/or recorded by solid state imaging device 100 according to an embodiment. In the particular implementation of FIG. 4, solid state imaging device 100 may receive infrared illumination 124, invisible with the unaided eye, reflecting from object 140 being illuminated by infrared image projection installation 120. Infrared image projection installation 120 may be installed adjacent object 140 to be illuminated so as illuminate surface 142 of object 140 visible to solid state imaging device 100. According to an embodiment, infrared illumination 124 reflected from object 140 may be sufficient to obscure the visible image as received by solid state imaging device 100 sufficient to render the received image undesirable. According to another embodiment, infrared illumination 124 reflected from object 140 may be a textural or symbolic message that spoils the image received by solid state imaging device 100 sufficient to render the image undesirable. According to an embodiment, the image as received by the solid state imaging device 100 may include an infrared portion comprising a message to appear superimposed onto object 140. Such a message may state, for example, but is not limited to, "copy protected artwork" or "copy protected."

In particular embodiments illustrated herein, visitors carry solid state imaging devices having the capability of imaging at least a portion of the infrared spectrum. For instance, such participants may carry, wear or otherwise be co-located with one or more solid state imaging devices such as, for example, digital cameras, digital camcorders, and integrated devices having a solid state imaging sensor, such as mobile phones, portable game consoles, devices embedded in garments, notebook computers, personal digital assistants and/or the like. However, in another potential embodiment, an imaging or other device may be adapted to at least partially block infrared light in those instances in which infrared light is to at least partially illuminate an object, such as if the object is illuminated with infrared light immediately before the imaging device is about to capture an image of said object. For example, an imaging device may include an infrared light sensor. If, in such an embodiment, infrared light is detected, the imaging device may, for example, include a mechanism for blocking or otherwise filtering out the infrared light that illuminates the object.

Figure 5:
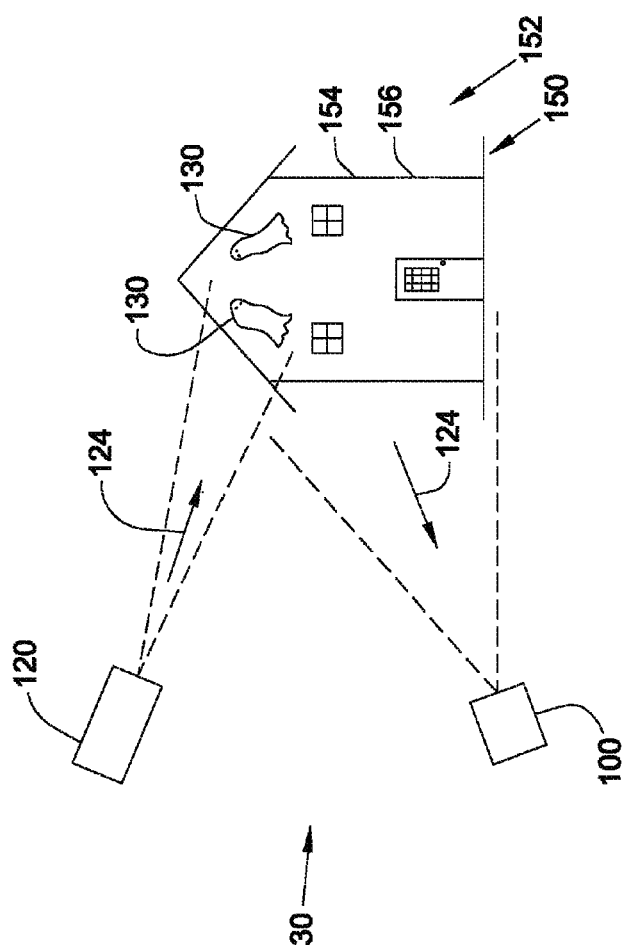
FIG. 5 illustrates a system comprising an infrared image projection installation configured to provide an enhanced experience to visitors according to an embodiment.

FIG. 5 illustrates system 30 comprising infrared image projection installation 120 configured to provide an enhanced experience to visitors according to an embodiment. In the particular implementation of FIG. 5, visitors associated with solid state imaging device 100 may receive infrared images 130, invisible with the unaided eye, at one or more infrared image projection installations 120. Infrared image projection installations 120 may be installed at visual content installation 150. According to an embodiment, visual content installation 150 comprises performance stage 152 and infrared image projection installation 120 may be operable to coordinate the projection of infrared images 130 onto an element of performance stage 152 so as to enhance the visual aspects of performance stage 152 as imaged by solid state imaging device 100. According to an embodiment, a visitor may view infrared image 130 superimposed onto visual content installation 150 using the solid state imaging device 100.

In a particular example provided for the purpose of illustration, infrared image projection installation 120 may be positioned adjacent visual content installation 150 that provides visual content 154 to those without solid state imaging device 100. Infrared image projection installation 120 projects infrared image 130 onto at least a portion of visual content installation 150 to provide additional visual content to the visitor viewing visual content installation 150 with solid state imaging device 100. For example, in visual content installation 150 representing a haunted house (e.g., as in a theme park attraction), infrared image projection installation 120 may project infrared image 130 representing a ghost onto the haunted house such that the visitor may view the ghost using solid state imaging device 100. Infrared image 130 may comprise a moving image of a ghost, a still image of text message or symbol, among other things, and/or combinations thereof.

Figure 6:
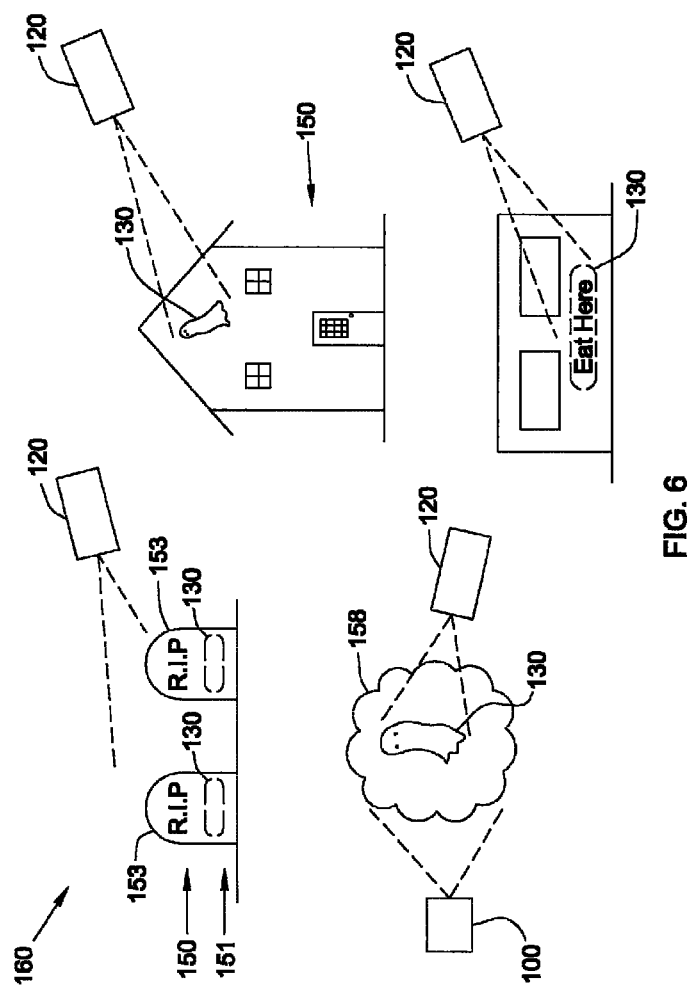
FIG. 6 is a schematic of a gaming environment in accordance with an embodiment.

FIG. 6 is a schematic of gaming environment 160 in accordance with an embodiment. In particular embodiments illustrated herein, participants in an interactive game may carry solid state imaging devices 100 having the capability of capturing images in at least a portion of the infrared spectrum. For instance, such participants may carry, wear or otherwise be co-located with one or more solid state imaging devices such as, for example, digital cameras, digital camcorders, and integrated devices having a solid state imaging sensor, such as mobile phones, portable game consoles, devices embedded in garments, notebook computers, personal digital assistants and/or the like.

In particular embodiments illustrated herein, participants in an interactive game may physically move about in gaming environment 160 to search for clues. For instance, such participants may visualize infrared images 130 using solid state imaging devices 100.

A game participant may participate in a game having an object of the game being, for example, completing tasks and/or performing actions in gaming environment 160. Such a participant may, for example, in an embodiment, participate in a game objective by locating a predefined number of a plurality of infrared images 130, with the challenge of finding the most infrared images 130 in a predetermined period of time.

According to an embodiment, gaming environment 160 may provide an interactive gaming experience to one or more "game participants" ("game participant" is to be used interchangeably herein with "participant"). In one particular embodiment a game participant may compete with another participant in finding the most infrared images 130 in a predetermined period of time, and/or to get to a destination the quickest based on finding clues in the infrared images 130, for example, among others.

Referring again to FIG. 6, gaming environment 160 comprises one or more infrared image projection installations 120 configured to provide a gaming experience to participants according to an embodiment. In the particular implementation of FIG. 6, game participants associated with solid state imaging devices 100 participate in a gaming experience at one or more infrared image projection installations 120. Infrared image projection installations 120 may be dispersed over a geographical area such as that of a theme or amusement park. In other embodiments infrared image projection installations may be dispersed over a geographical area such as a neighborhood, school or business campus, convention center, theatre complex, town, metropolitan area, political subdivision such as a city, state or nation, just to name a few examples.

According to an embodiment, a game participant may travel to different infrared image projection installations 120 while carrying solid state imaging device 100 to visualize an infrared image 130 and participate in a gaming experience having an objective, at least in part, on finding a plurality of infrared images 130, "invisible" to the unassisted eye, viewable with the assistance of the participant's solid state imaging device 100. According to another embodiment, the participant records each infrared image 130 onto the solid state imaging device 100 so as to verify at a later time that indeed the infrared image 130 was seen.

According to an embodiment, a gaming experience includes finding a plurality of infrared images 130, such as, but not limited to, in the form of text, still image, moving image, symbol and the like, including combinations thereof. According to another embodiment, a gaming experience further includes solving a puzzle which may be solvable by correctly answering or solving a series of riddles or problems based on the found images. According to another embodiment, gaming experience includes locating a plurality of infrared images 130 in a predetermined sequence to provide directions to a destination.

Infrared image projection installations 120 may exist at a fixed location in game environment 160, or may be mobile such that its position changes during game play. Infrared image projection installation 120 may be manned or unmanned. In an embodiment, infrared image projection installation 120 may be integrated with a character costume. In an embodiment, infrared image projection installation 120 may be integrated with a themed structure. In an embodiment, infrared image projection installation 120 may be integrated with a water feature 158, such as a mist generator or pond such that infrared image 130 appears to be floating in mid-air or on or underwater, respectively. It is appreciated that the infrared image 130 may reflect from a variety of infrared reflective media, such as, but not limited to, mist, smoke, water, screen, netting, wall, flat substrate, non-flat substrate, and film.

In a particular example provided for the purpose of illustration, infrared image projection installation 120 may be positioned adjacent a visual content installation 150 that provides visual content to those not viewing the visual content installation 150 with the assistance of solid state imaging device 100. infrared image projection installation 120 may project infrared image 130 onto at least a portion of visual content installation 150 to provide additional visual content to the participant viewing visual content installation 150 with solid state imaging device 100. For example, where visual content installation 150 represents graveyard 151 comprising a plurality of tombstones 153, infrared image projection installation 120 may project infrared image 130 of a ghost onto tombstone 153 such that the participant may view the ghost using solid state imaging device 100. Infrared image 130 may comprise a moving image of a ghost, a still image of text message or symbol or graphic, among other things, and/or combinations thereof.

According to an embodiment, the number of infrared images 130 viewed and recorded on solid state imaging device 100 may be evaluated by an attendant to provide a reward for finding a predetermined number of infrared images 130. The reward may be any desirable benefit, such as, but not limited to, a prize. According to another embodiment, the value of the reward is dependent on meeting one of a plurality of objects of the game.

In particular embodiments illustrated herein, infrared illumination may be used to obscure an image displayed on a display monitor as viewed and/or recorded by a solid state imaging device. In a particular embodiment, the quality of an image on a display monitor captured using a solid state imaging device may be degraded so as to discourage photographing the image on a display monitor. According to another embodiment, the image on a display monitor as viewed and/or recorded by a solid state imaging device may be annotated with a message. In these embodiments, the visible aspects of the image on a display monitor are not modified to the unaided eye.

In a particular embodiment, a visitor or participant presents a solid state imaging device having the capability of imaging at least a portion of the infrared spectrum. For instance, such visitor or participant may carry, wear or otherwise be co-located with a solid state imaging device such as, for example, a digital camera, digital camcorder, and integrated devices having a solid state imaging sensor, such as a mobile phone, notebook computer, personal digital assistant, and/or the like.

Figure 7:
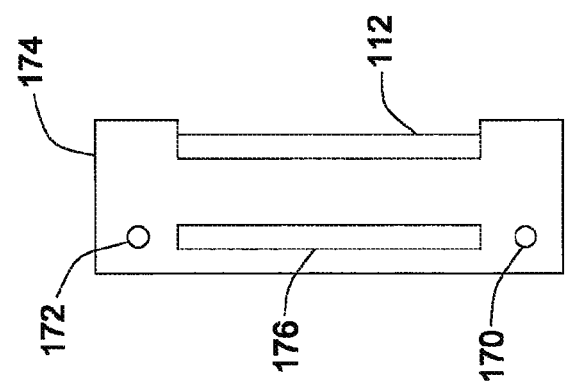
FIG. 7 is a side cross-sectional view of a display monitor comprising a back light visible spectrum illumination source, an infrared spectrum illumination source, a diffuser, and a display screen according to an embodiment.

FIG. 7 is a side cross-sectional view of display monitor 174 comprising a back light visible spectrum illumination source 170, infrared spectrum illumination source 172, diffuser 176, and display screen 112, configured to obscure an image on display monitor 174 as viewed and/or recorded by a solid state imaging device 100 according to an embodiment. In the particular implementation of FIG. 7, a solid state imaging device may receive infrared images, invisible with the unaided eye, emanating from display screen 112.

Figure 8:
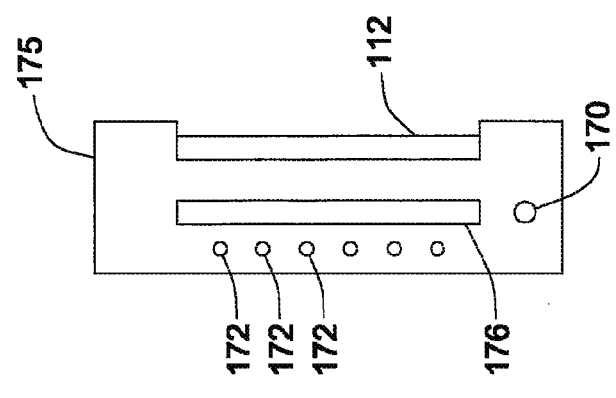
FIG. 8 is a side cross-sectional view of a display monitor comprising a back light visible spectrum illumination source, a plurality of infrared spectrum illumination sources, a diffuser, and a display screen according to an embodiment.

FIG. 8 is a side cross-sectional view of display monitor 175 comprising a back light visible spectrum illumination source 170, a plurality of infrared spectrum illumination sources 172, diffuser 176, and display screen 112, configured to obscure an image on display monitor 175 as viewed and/or recorded by a solid state imaging device according to an embodiment. The plurality of discrete infrared illumination sources 172 are located behind display screen 112 and operable so as to project infrared illumination through display screen 112 that may be imaged by a solid state imaging device. Discrete infrared illumination sources 172 may be uniformly arranged relative to the display screen 112 so as to oversaturate the pixels of a solid state imaging device with infrared energy; that is, to over expose the resulting image sufficient to render the image as received by a solid state imaging device undesirable. According to another embodiment, discrete infrared illumination sources 174 may be preferentially arranged so as to form a text message, a distorting pattern, a symbol, and/or other resulting image sufficient to render the image as received by a solid state imaging device undesirable.

Figure 9:
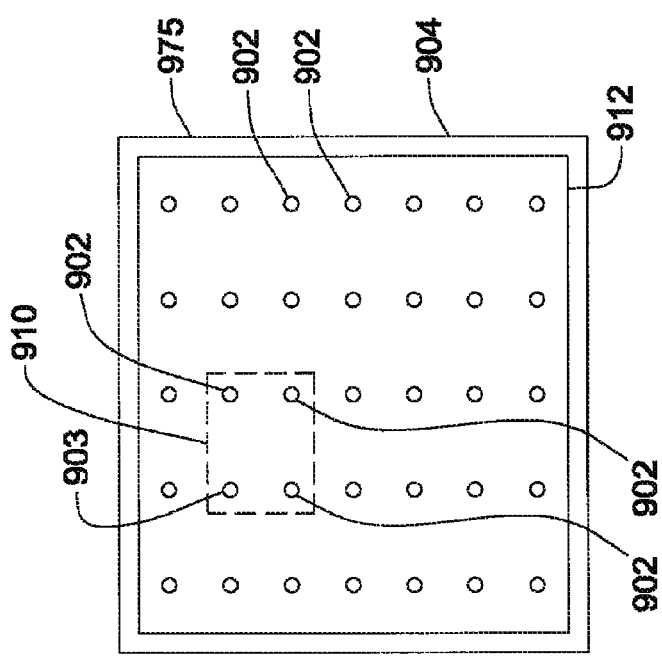
FIG. 9 is a front view of an embodiment of LED display comprising a panel and a plurality of light emitting diodes.

FIG. 9 is a front view of an embodiment of LED display 975 comprising a panel 904 and a plurality of light emitting diodes (LED) 902. Individual LEOs 902 may be coupled to panel 904 in a predetermined arrangement. By way of example, pixel 910 comprises a predetermined number of LEOs 902. Pixel 910 may include any combination of red, green, or blue colored LEOs 902. In an embodiment, pixel 910 further comprises infrared (IR) LED 903. IR LED 903 is an LED operable to emit infrared radiation. In an implementation of LED display 975, a predetermined number of IR LEOs 903 may be arranged in a predetermined arrangement suitable for a particular purpose.

By way of example and explanation, LED display 975 may comprise LEOs 902 arranged on panel 904 having a 30 mm pitch with a 4-red/3-green/3-blue LEOs 902 per pixel 910. This provides over 130,000 pixels 910 from a total of more than 650,000 LEOs 902. LED display 975 may provide a full-color, video capability. LED display 975 may comprise a range of sizes and formats suitable for, but not limited to, indoor shopping malls, off-road billboard displays, or bus shelters. In other embodiments, LED display 975 may be provided as network-capable, multi-sign configurations.

In an implementation of LED display 975, a plurality of IR LEOs 903 may be arranged so as to provide image copy protection. In a particular implementation, IR LEOs 903 may be uniformly arranged on panel 904 so as to distort or obscure the resulting image produced by LEOs 902 sufficient to render the image undesirable as received by a solid state imaging device. According to another implementation, IR LEOs 903 may be preferentially arranged so as to form a text message, a distorting pattern, a symbol, or other resulting image as received by a solid state imaging device. The text message, distorting pattern, symbol, or other resulting image may render the image undesirable as received by solid state imaging device.

According to yet another implementation, IR LEOs 903 may be preferentially arranged so as to form a text message, a symbol, or other resulting image that may be enjoyed when viewed by a solid state imaging device.

In accordance with an embodiment, LED display 975 further comprises an IR light diffuser 912. IR light diffuser 912 may be operable to diffuse infrared light so as to soften or blur together the IR light from individual IR LEOs 903 as viewed from a side of IR light diffuser 912 opposite from IR LEOs 903. IR light diffuser 912 may be placed in close proximity to IR LEOs 903 so as to blend the points of IR light together to make a fuzzy infrared image, particularly suitable, for example, for images of ghosts. By way of an example of an implementation, LED display 975 may be placed in a window of a building such as a haunted mansion in a theme park so as to present an image of a ghost as received by a solid state imaging device.

In yet another implementation, IR light diffuser 912 may also be operable for use as a projection screen so as to provide, by way of example, a projected scene as viewed with the unaided eye that is augmented with an IR image as received by a solid state imaging device.

Figure 10A:
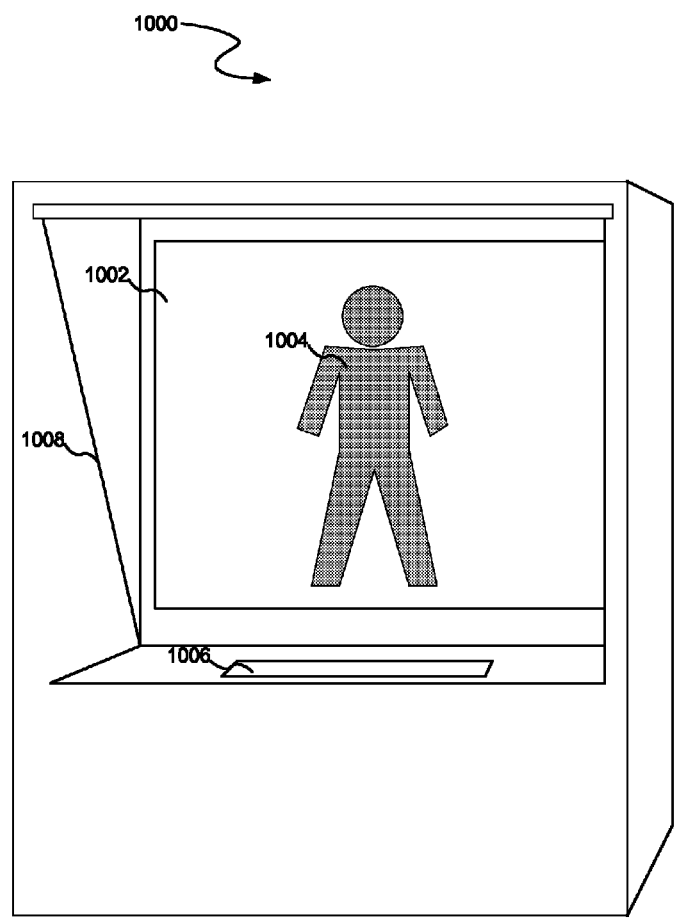
FIG. 10A illustrates a kiosk that may be utilized to view an image.

In an alternative embodiment, a mirror is positioned in front of an LCD display screen. The mirror is at least partially transparent on a first side and at least partially reflective on a second side. As an example, the mirror may be a two-way mirror. The mirror may be glass panel that has the aforementioned transparent and reflective properties. FIG. 10A illustrates a kiosk 1000 that may be utilized to view an image. The kiosk 1000 includes a display screen 1002 that displays an image in visible light. In other words, a light emitting device illuminates the display screen 1002 with visible light such that a user positioned proximate to the kiosk 1000 may view the image. As an example, a user may view an image 1004 in visible light of himself or herself. Further, the kiosk 1000 may have an input/output ("I/O") device 1006 that allows the user to interact with the kiosk 1000. For example, I/O device may be a touch screen, keyboard, or the like. The user may utilize the I/O device 1006 to provide an input indicating a decision of whether or not the user would like to purchase a copy of the image 1004. The kiosk 1000 also has a mirror 1008 that is positioned in front of the display screen 102 at an angle. As an example, the angle may be a forty-five degree angle. The visible light from the display screen 1002 to a first side of the mirror 1008, i.e., the inside surface of the mirror 1080 and through a second side of the mirror 1008, i.e., the outside surface of the mirror. As the mirror 1008 is at least partially transparent such that visible light travels from the first side to the second side, the user may view the image 1004.

Figure 10B:
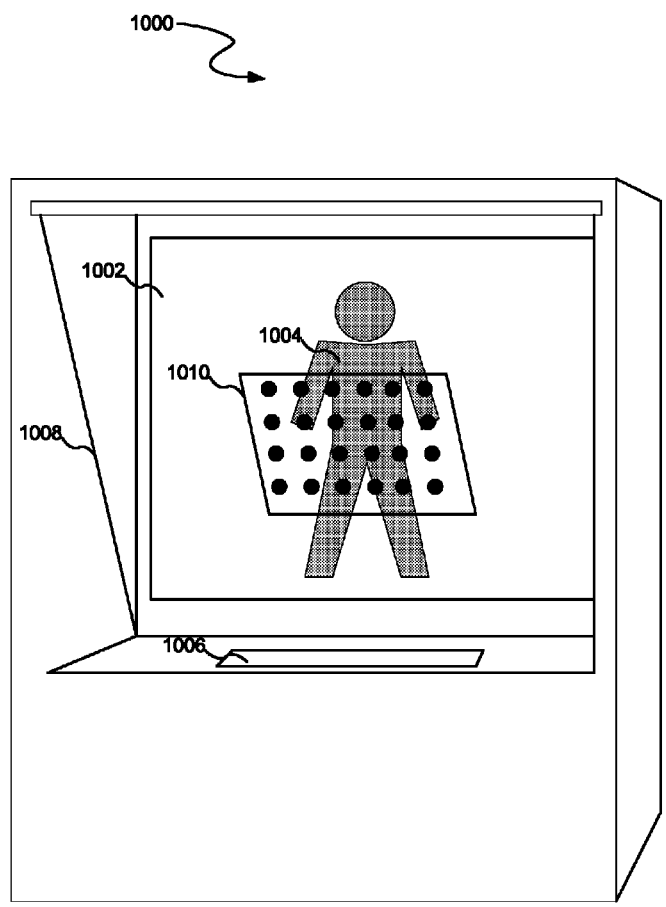
FIG. 10B illustrates the kiosk of FIG. 10A with an infrared overlay image 110.

FIG. 10B illustrates the kiosk 1000 of FIG. 10A with an infrared overlay image 110. A plurality of infrared emitters, which is positioned on the outside of the second side of the mirror 1008, transmits infrared light toward the mirror 1008. As the second side of the mirror 1008 is at least partially reflective, the infrared light is reflected from mirror 1008. As a result, the infrared overlay image is displayed on the second side of the mirror 1008. As infrared light is invisible to human beings, a user will still be able to view the image 1004 as illustrated in FIG. 10A. However, a camera sensor captures visible light and infrared light. Accordingly, a camera sensor may capture both the image 1004 and the infrared overlay image 1010. As a result, a user may be able to view the image 104, but the user will not be able to utilize a camera to take a picture of the image 1004 without the infrared overlay image 1004. Accordingly, the user is incentivized to purchase a copy of the image 1004 from the kiosk 1000 rather than taking a picture of the image 1004.

In one embodiment, the infrared emitters include various emitters of varying wavelengths. For example, some cameras capture infrared wavelengths of 750 nm and other cameras capture infrared wavelengths of 850 nm. If infrared emitters that capture 750 nm are only utilized, then some cameras that capture infrared wavelengths of 850 nm, but not 750 nm, may avoid capturing the infrared overlay image 110. The wavelengths may or may not overlap. Accordingly, dissimilar wavelengths may be utilized in that the wavelengths may be incongruent. Accordingly, various infrared emitters may be utilized to capture a variety of different wavelengths that may be captured by different camera devices. As an example, an arrangement of 750 nm, 850 nm, and/or 950 nm infrared emitters may be utilized. In one embodiment, the infrared emitters are infrared emitting LEDs. Accordingly, the infrared emitters may emit a variety of bands of infrared light such as near infrared, infrared, and far infrared may be utilized. The infrared bands are invisible light. Further, invisible light may include other forms of light.

The infrared overlay image 1008 is illustrated as a grid of dots only as an example. In this example, the plurality of infrared emitters is arranged in a grid. However, the plurality of infrared emitters may be arranged in other various shapes or formats. Further, the infrared overlay image 1008 is illustrated as only partially covering the image 1004 as an example. The infrared overlay image 1008 may alternatively cover the entire image 1004.

Figure 11:
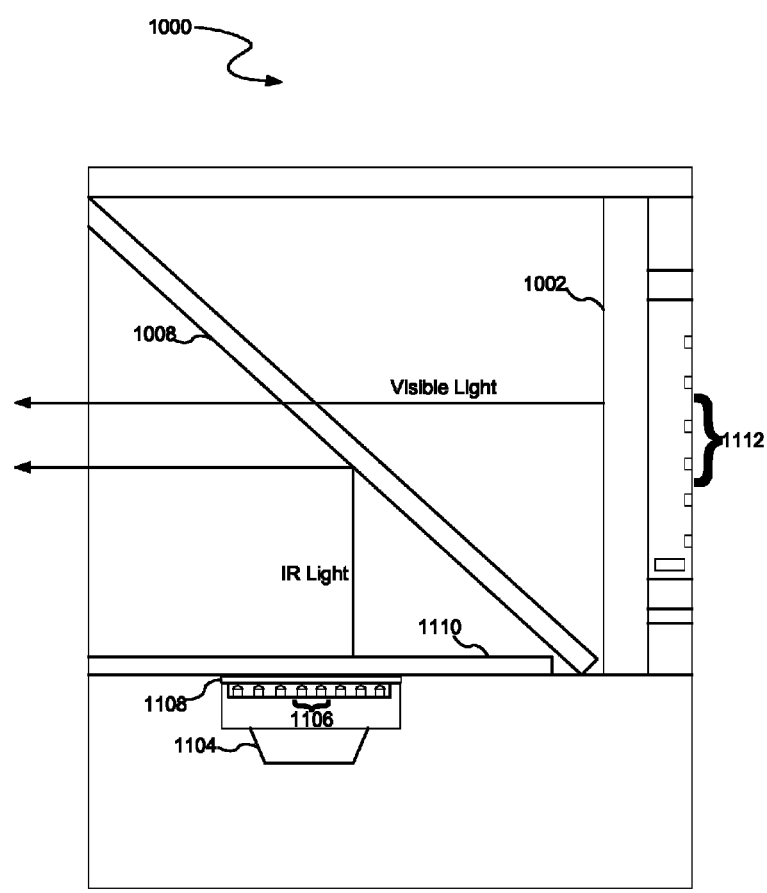
FIG. 11 illustrates a side and inner view of the kiosk illustrated in FIG. 10A and FIG. 10B.

FIG. 11 illustrates a side and inner view of the kiosk 1000 illustrated in FIG. 10A and FIG. 10B. The display screen 1002 may have a light source that is a light emitting device. The light emitting device may be or include a plurality of LEDs 1102 that emit visible light that travels through the mirror 1008. Further, the kiosk 1000 includes an infrared light source 1104. The infrared light source 1104 may be a device that includes a plurality of infrared emitters 1106. In one embodiment, a fluorescent light diffusion surface 1108 may be utilized to diffuse the infrared light. As an example, the fluorescent light diffusion surface 1108 may be polycarbonate. Further, in one embodiment, infrared transmitting plexiglass 1110 may be utilized over the fluorescent light diffusion surface 1108.

The configuration illustrated in FIG. 11 utilizes a peppers ghost technique to make an image visible to a viewer of the image emitted from the display screen 1002, but invisible or partially invisible to a camera sensor. The camera sensor may be part of a stand-alone camera, cell phone camera, smartphone camera, tablet camera, personal digital assistant ("PDA") camera, or the like.

In one embodiment, the mirror 1008, the infrared light source 1104, plurality of infrared emitters 1106, the fluorescent light diffusion surface 1108, and/or the infrared transmitting plexiglass 1110 may be added to an existing kiosk as a retrofit. In another embodiment, the mirror 1008, the infrared light source 1104, plurality of infrared emitters 1106, the fluorescent light diffusion surface 1108, and/or the infrared transmitting plexiglass 1110 are provided as part of a kiosk.

In another embodiment, a variety of side emitting LEDs may be utilized to light-pipe into an edge of a light scattering plastic or glass. As an example, the side emitting LEDs may be 750 nm, 850 nm, and 950 nm. However, a variety of other wavelengths may be utilized for the side emitting LEDs. The light scattering plastic or glass may either have scattering material embedded into the sheet or have an etched surface to scatter the edge light when it is in the material. This flat plastic or glass may be positioned in front of an LCD and may appear to a user to be a piece of clear material situated in front of the LCD. However, when a user views the flat plastic or glass through a camera with a charge-coupled device ("CCD") or the like, the user may view a white opaque piece of material situated in front of the LCD that obscures the view of the user. In yet another embodiment, metal halide, incandescent bulbs, or the like may be utilized an infrared band pass filter or an infrared heating element to provide infrared light radiation.

Figure 12:
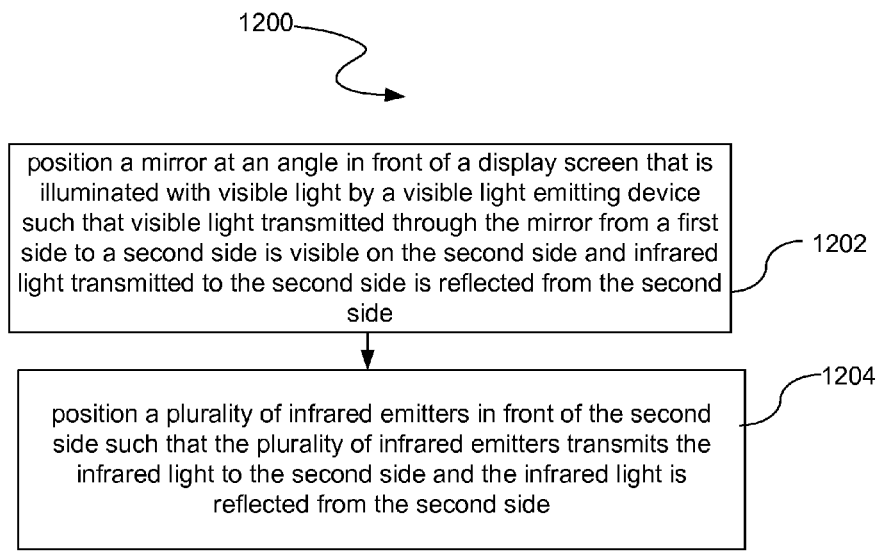
FIG. 12 illustrates a process that may be utilized to provide infrared imaging projection for camera blocking.

FIG. 12 illustrates a process 1200 that may be utilized to provide infrared imaging projection for camera blocking. At a process block 1202, the process 1200 positions a mirror at an angle in front of a display screen that is illuminated with visible light by a visible light emitting device such that visible light transmitted through the mirror from a first side to a second side is visible on the second side and infrared light transmitted to the second side is reflected from the second side. The mirror is at least partially transparent on the first side and at least partially reflective on the second side. Further, at a process block 1204, the process 1200 positions a plurality of infrared emitters in front of the second side such that the plurality of infrared emitters transmits the infrared light to the second side and the infrared light is reflected from the second side.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer, laptop, smartphone, cell phone, tablet, laptop, PDA, kiosk, set-top box ("STB"), or the like.

It is understood that the apparatuses, systems, computer program products, and processes described herein may also be applied in other types of apparatuses, systems, computer program products, and processes. Those skilled in the art will appreciate that the various adaptations and modifications of the embodiments of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. An apparatus comprising:
   a mirror that is at least partially transparent on a first side and at least partially reflective on a second side, the mirror being positioned at an angle in front of a display such that visible light emitted from the display is reflected from the second side; and
   a plurality of invisible light emitters positioned in front of the second side that transmits the invisible light through the mirror from the second side to the first side.

2. The apparatus of claim 1, wherein the plurality of invisible light emitters includes a first set of infrared emitters that emit infrared light having a first wavelength and a second set of infrared emitters that emit infrared light having a second wavelength that is dissimilar from the first wavelength.

3. The apparatus of claim 2, wherein the second wavelength is filtered by a second camera sensor without the first wavelength being filtered by the second camera sensor.

4. An apparatus comprising:
   a mirror that is at least partially transparent on a first side and at least partially reflective on a second side, the mirror being positioned at an angle in front of a display such that visible light emitted from the display is transmitted through the mirror from the first side to the second side and invisible light transmitted to the second side is reflected from the second side; and
   a plurality of invisible light emitters positioned in front of the second side that transmits the invisible light to the second side such that the invisible light is reflected from the second side, wherein the plurality of invisible light emitters includes a first set of infrared emitters that emit infrared light having a first wavelength and a second set of infrared emitters that emit infrared light having a second wavelength that is dissimilar from the first wavelength, wherein the second wavelength is filtered by a second camera sensor without the first wavelength being filtered by the second camera sensor.

5. The apparatus of claim 4, wherein the plurality of invisible light emitters is placed in front of the display screen without being embedded within the display screen.

6. The apparatus of claim 4, wherein the invisible light reflected from the second side imposes an infrared overlay image over an image produced by the visible light.

7. The apparatus of claim 4, wherein the plurality of invisible light emitters comprises a plurality of infrared emitting light emitting diodes.

8. The apparatus of claim 4, wherein the display screen comprises a liquid crystal display screen.

9. The apparatus of claim 4, wherein the mirror comprises a two-way mirror.

10. The apparatus of claim 4, wherein the angle of the mirror is configured to utilize a peppers ghost technique.

11. The apparatus of claim 4, wherein the plurality of invisible light emitters is arranged in a grid.

12. The apparatus of claim 4, further comprising infrared transmitting plexiglass that is positioned over between the plurality of infrared emitters and the second side.

13. A method comprising:
   emitting visible light comprising an image in a first direction;
   emitting invisible light in a second direction not coincident with the first direction, wherein the act of emitting invisible light comprises emitting a first infrared wavelength and a second infrared wavelength that is dissimilar from the first wavelength, a first set of infrared emitters that emit infrared light having a first wavelength and a second set of infrared emitters that emit infrared light having a second wavelength that is distinct from the first wavelength, wherein the second wavelength is filtered by a second camera sensor without the first wavelength being filtered by the second camera sensor; and bending at least one of the visible light and the invisible light such that the visible light and the invisible light are combined and directed at a viewing location.

14. The method of claim 13, wherein the plurality of infrared emitters is placed in front of the display screen without being embedded within the display screen.

15. The method of claim 13, wherein the infrared light reflected from the second side imposes an infrared overlay image over an image produced by the visible light.

* * * * *